United States Patent

[11] 3,619,663

| [72] | Inventor | Kalman Molnar<br>Budapest, Hungary |
|---|---|---|
| [21] | Appl. No. | 37,807 |
| [22] | Filed | May 15, 1970 |
| [45] | Patented | Nov. 9, 1971 |
| [73] | Assignee | Merestechnikai Kozponti Kutato Laboratorium<br>Budapest V, Hungary |
| [32] | Priority | May 15, 1969 |
| [33] | | Hungary |
| [31] | | ME 1072 |

[54] LINEARITY ERROR COMPENSATION CIRCUIT
9 Claims, 9 Drawing Figs.

[52] U.S. Cl.................................................. 307/271,
331/145, 307/273, 307/262
[51] Int. Cl..................................................... H03k 1/10
[50] Field of Search........................................ 324/120;
307/271, 272, 273, 261, 260, 262; 235/150.3;
331/145

[56] References Cited
UNITED STATES PATENTS

| 3,204,124 | 8/1965 | Durio, Jr. ............... | 307/271 |
| 3,258,605 | 6/1966 | Clark...................... | 307/271 |
| 3,297,880 | 1/1967 | Clarke..................... | 307/271 |
| 3,308,387 | 3/1967 | Hackett................... | 307/271 |
| 3,448,408 | 6/1969 | Wapner et al. .......... | 307/271 |

Primary Examiner—Donald D. Forrer
Assistant Examiner—R. E. Hart
Attorney—Young & Thompson ABSTRACT: The linearity error compensation circuit for a meter converter includes a monostable multivibrator for receiving an output frequency signal from the meter converter which varies in response to a function being metered. The multivibrator controls a switch which passes either a reference input to a function transformer or a level regulator which are connected between a voltage blocking circuit connected to the multivibrator output and a voltage-frequency converter. The output of the voltage-frequency converter is connected to an arithmetic unit which is also connected to the output of the meter converter.

INVENTOR
KÁLMÁN MOLNÁR

LINEARITY ERROR COMPENSATION CIRCUIT

BACKGROUND OF THE INVENTION

The present invention relates to a linearity error compensation circuit for a meter converter of the type which provides an output signal having a frequency which is indicative of a metered function.

The significant advantage of a meter converter which provides a frequency output signal is that it can be adapted for digital processing by simple means. When information supplied by the converter is processed by a digital computer, the linearization of the characteristic can be programmed in the computer. This is, however, a rather expensive solution. In the great majority of cases, information is fed into a digital measuring instrument, for instance, a frequency meter, impulse recorder etc. To make the most of the precision obtained by digital data processing, a converter of low linearity error is needed. The reduction of the linearity error of a converter beyond a certain limit is, however, quite expensive.

With a turbine flow meter, for instance, the frequency of the output signal is proportionate to the volumetric velocity of the fluid, within linearity error. In the case of water, in a range limited by full-scale deflections of 10 to 1, linearity error is 0.5 percent and the reduction of the linearity error to half this amount results in significant difficulties. In fact, this possibility is available only with some instruments designed for the metering of high flow velocities.

A meter converter providing a frequency output signal produces a series of impulses of a frequency $f_b$, varying as a function of the unknown quantity to be metered. Frequency $f_b$ differs from a theoretical frequency $f_k$ which is linear representation of the metered quantity. The departure between the two frequencies is the linearity error of the meter converter, $f_h$:

$$f_b - f_k = \pm f_h$$

From the characteristic plotted in the calibration of the converter, the relative linearity error $h$, belonging to particular values of output frequency $f_b$, i.e. the function $h=h(f_b)$ can be determined. Then $f_h = h f_b$.

Frequency $f_k$ in linear relationship with the unknown is thus given as the algebraic sum of the output frequency $f_b$ and the linearity error $f_h$ obtained from output frequency $f_b$ being multiplied by relative linearity error $h$.

A primary object of the present invention is to provide a novel linearity error compensation circuit of simple design to be inserted between a meter converter having an output signal which varies in frequency as a function of an unknown quantity to be metered and an electronic unit for processing the information provided by such meter converter.

Another object of the present invention is to provide a novel method for reducing the linearity error of a meter converter having an output signal which varies in frequency as a function of an unknown quantity to be metered.

These and other objects of the present invention will become apparent upon a consideration of the following specification taken in conjunction with the accompanying drawings in which:

SUMMARY OF THE INVENTION

Figure 1:
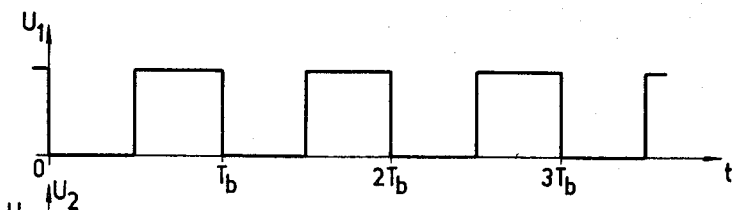
FIGS. 1-7 illustrate voltage waveforms appearing at points in the circuit of the present invention.
Figure 2:
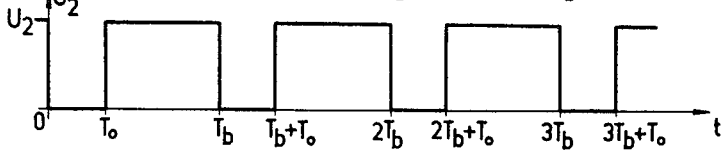
Figure 3:
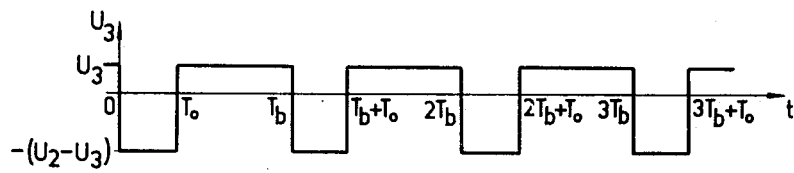
Figure 4:
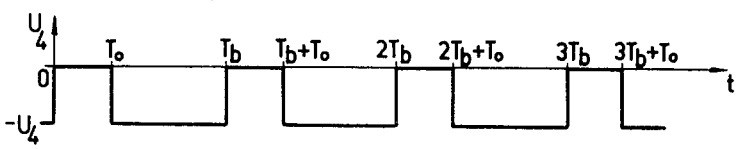
Figure 5:
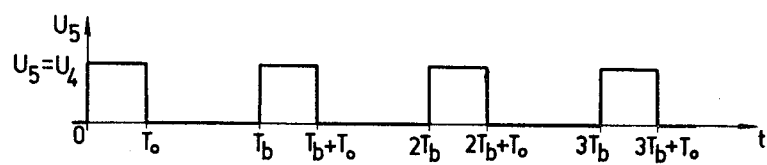
Figure 6:
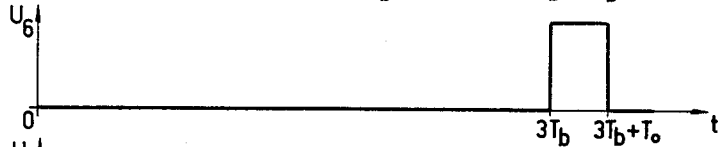
Figure 7:
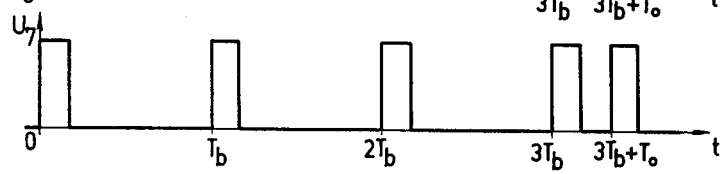

The invention is based on the theory that, when the converter output signal, of frequency $f_b$ and cycle time $T_b$ is employed to drive a monostable multivibrator to obtain a series of impulses of constant amplitude and these impulses are passed through a DC voltage stopping or blocking circuit, through a switch controlled by the monostable multivibrator and to the input of a level regulator, then the mean voltage of the signal that appears on the output of the latter will be proportionate to the second power of frequency $f_b$; while the level regulator transfers the peak value of the input voltage to zero level. The switch should be controlled by the monostable multivibrator in such a way that, in the stable periods of the multivibrator, the input of the level regulator is connected to the output of the DC voltage stopping circuit and in the quasi-stable periods to zero level.

Between the DC voltage stopping circuit and the level regulator, or behind the level regulator, a function generator or transformer is connected which, transforming the function $h=h(f_b)$, from a voltage proportionate to the frequency $f_b$, produces a voltage proportionate to the relative linearity error $h$ and of a polarity depending on the sign of the error. During the quasi-stable periods of the multivibrator, voltage appearing on the output of the function transformer or of the level regulating unit, the sequence of the two units being indifferent, will be proportionate to the relative linearity error $h$ (belonging to the momentary frequency $f_b$, and following from this, the mean voltage will be proportionate to the product of frequency $f_b$ and relative linearity error $h$ its sign depending on the sign of relative linearity error $h$ belonging to the momentary frequency $f_b$.

It is advantageous to place the function transformer directly in front of the level regulator, as in this case the level regulator will not pass the drift of the function transformer. In such arrangement the function transformer is placed between the switch controlled by the monostable multivibrator and the level regulator.

In the function transformer, the approximations of the transformation of the function by lengths of straight lines are accomplished by a standard, known diode-and-resistor circuit making use of a reference voltage. This is why the function transformer, in addition to a signal input, has an additional reference input connected to a reference source. In case of a general function $h=h(f_b)$, both inputs must be operated by switches controlled by the multivibrator. Thus signal input and reference input are connected to zero level at the same time and zero level appears also on the output of the signal transformer. Of the two switches, the one on the signal input may be replaced by a rectifier, as the output signal of the DC voltage stopping circuit in the quasi-stable and stable conditions of the multivibrator is of opposite polarity.

Things are simpler when with a frequency $f_b=0$, a relative linearity error $h=0$ occurs, or this value may be ordered to it. Considering that when frequency $f_b$ is zero, the voltage across the level regulator output will be zero anyhow, in principle it is possible to order $h=0$ to $f_b=0$ at any time. Then the starting length of function $h(f_b)$ has to be substituted by a straight line described by the relationship $H=Kf_b$, where $k$ characterized the steepness of the straight line. If the lower limit of the range of the meter converter is different from zero frequency $f_b$, this substitution can take place without the section of function $h=h(f_b)$ falling within the measuring range being changed. If, however, the measuring range also includes the frequency $f_b=0$, the substitution requires the modification of the lower range of the function $h=h(f_b)$.

To the frequency $f_b=0$, a value of $h=0$ can be ordered as long as the error originating in the forming of the mean voltage, proportionate to the product of frequency $f_b$ and the relative linearity error $h$ coming from the departure from the true function $h=h(f_b)$ in the starting length produced by the substitution, is negligible.

When zero level voltage is fed to the function transformer adjusted corresponding to relative linearity error $h$, belonging to, or ordered to, frequency $f_b=0$, zero voltage will appear also, on the output of the function transformer. In such case, the switch controlled by the monostable multivibrator may be omitted from the reference input of the function transformer, and replaced by a rectifier between the signal input of the function transformer and the DC voltage stopping circuit. From the voltage that appears on the output of the DC voltage stopping circuit, the rectifier allows only the part generated during the stable periods of the monostable multivibrator to pass to the function transformer, and blocks the voltage of opposite polarity that occurs in the quasi-stable periods of the multivibrator. In these quasi-stable periods, the rectifier passes zero voltage to the transformer, and thus during the same periods, zero voltage also appears on the output of the function transformer. As a result of this arrangement, during the stable periods of the monostable multivibrator, voltage proportionate to relative linearity error $h$ belonging to the momentary frequency $f_b$ will pass to the input of the level regulator, whereas during the quasi-stable periods, the input of the level regulator receives a zero voltage level.

On the output of the level regulator, a mean voltage proportionate to the product of the momentary frequency $f_b$ and the relative linearity error $h$ associated therewith will be found. Thus, a voltage-frequency converter having an adequately selected conversion factor and operating on both positive and negative voltages connected to the output of the level regulator will produce series of impulses of frequency $f_h$, equal to the absolute value of the product of the momentary frequency $f_b$ and the relative linearity error $h$ associated with $f_b$. In addition, the voltage-frequency converter indicates the polarity of the voltage passing to the input of the voltage-frequency converter, i.e. the sign of the linearity error.

The addition of the output impulse series of the voltage-frequency converter to the impulse series of frequency $f_b$ of the meter frequency converter in an impulse adding device, or the subtraction of these impulse series in an impulse subtracting device, depending on the sign of the linearity error, results in a linearized signal.

If the linearity error of the meter converter does not change signs within the measurement range, this permits a simplification by which the device requires only an impulse-series adding or only an impulse-series subtracting device, depending on the constant sign of the linearity error, and also the voltage-frequency converter may work on input voltages of a single polarity only, positive or negative.

In order to simplify the design of the impulse-series adding or subtracting device, the impulse series of frequencies $f_b$ and $f_h$, respectively, are synchronized. To this end, the impulse generator that discharges a capacitor which forms the basis of the voltage-frequency converter is employed. This capacitor is charged under the effect of the input voltage driven by the monostable multivibrator and, as a consequence, the impulse series of frequency $f_h$ thus produced will be synchronous with the impulse series of frequency $f_b$ of the meter converter.

The above operation may be performed with the novel circuit of the present invention which basically includes a function transformer, a voltage-frequency converter and an impulse-series adding and/or subtracting device connected to both the output of the voltage-frequency converter and the meter converter. The essence of the circuit is that it includes a monostable multivibrator having the same input as the meter converter output, a DC voltage stopping circuit connected to the multivibrator, a switch controlled by the monostable multivibrator and a level regulator.

The function transformer and the level regulator are located between the DC voltage stopping circuit and the voltage-frequency converter, and the switch controlled by the monostable multivibrator provides either the reference input to the function transformer or the input to the level regulator. A rectifier is applied on the input of the function transformer if needed. In case the zero-frequency signal of the meter converter has a zero relative linearity error, a rectifier may then be connected to receive the output of the DC voltage stopping circuit. The output of the function transformer is identical with the input of the level regulator while the reference input of the function transformer is connected to a reference voltage source. In order to synchronize the output frequency signal of the voltage-frequency converter with the output frequency signal of the meter converter, the input of an impulse generator in the voltage-frequency converter is identical with the output of the monostable multivibrator.

Figure 8:
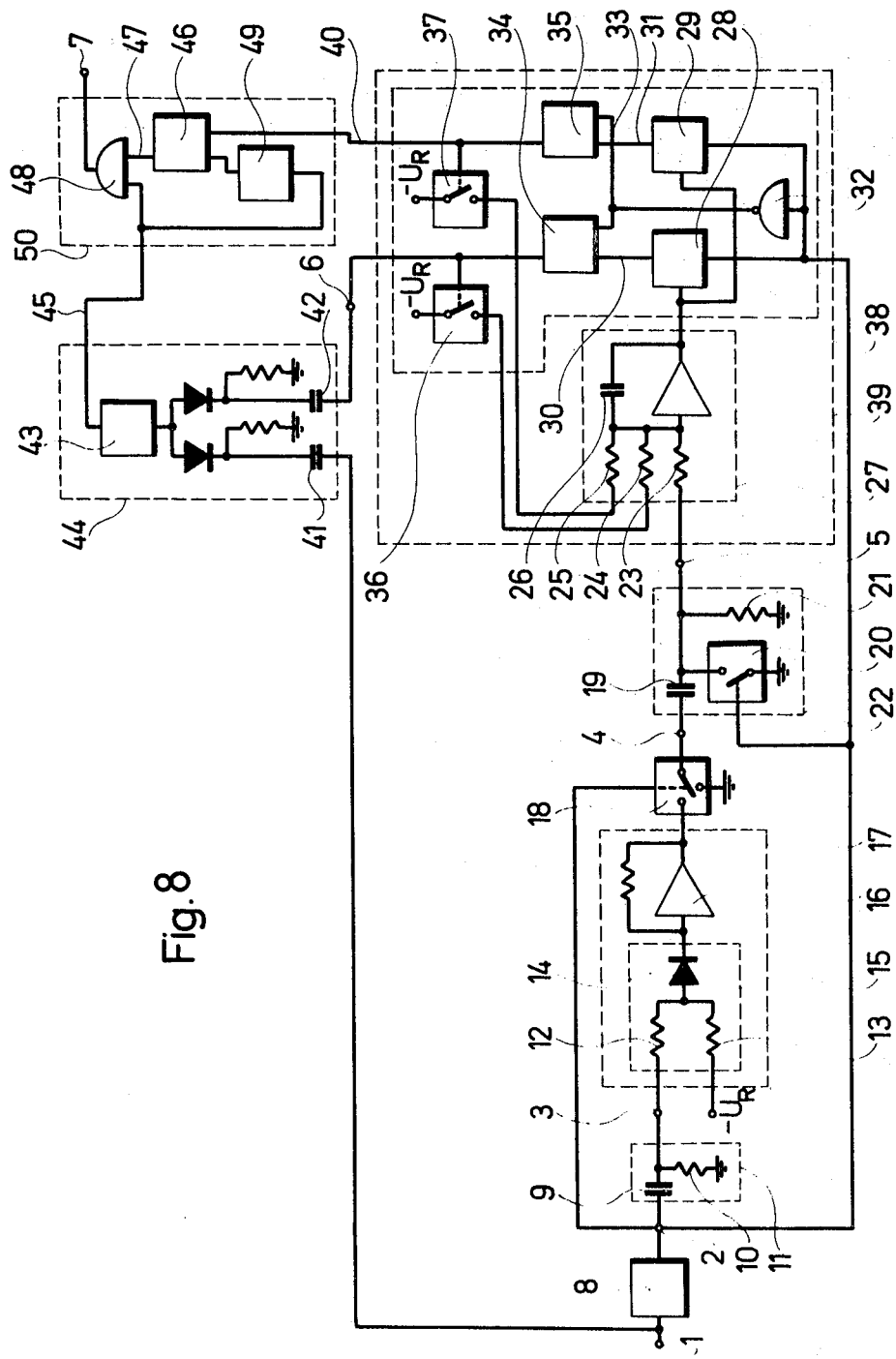
FIG. 8 is a circuit diagram of the linearity error compensation circuit of the present invention.
Figure 9:
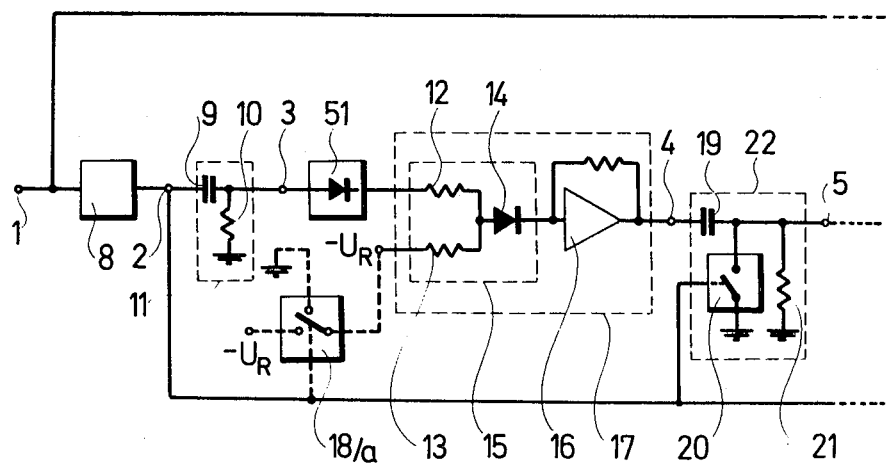
FIG. 9 is a circuit diagram of a second embodiment of the linearity error compensation circuit of the present invention.

FIG. 8 represents an embodiment selected as an example of the invention for the case of any chosen function $h=h(f_b)$, while FIG. 9 shows a modification of the embodiment of FIG. 8 which provides a simplified alternative circuit for a function $h=h(f_b)$ in which to the frequency $f_b=0$, a relative linearity error $h=o$ belongs or can be ordered. FIG. 9 also shows an alternative arrangement of the switch controlled by the monostable multivibrator (by broken lines) for the case of a general function $h=h(f_b)$.

Referring now to FIGS. 1–8, an impulse series $u_1$, of frequency $f_b$, and cycle time $T_b$, passes to the linearity error compensation circuit through terminal 1. When the voltage of this impulse series abruptly changes in the negative, a monostable multivibrator 8 changes from a stable to quasi-stable state and keeps this state for a time duration $T_o$. Depending on the timing elements, duration $T_o$ is always shorter than the shortest cycle time $T_b$ that can possibly occur. On an output 2 of the monostable multivibrator 8 an impulse series $u_2$ appears. Series $u_2$, of amplitude $U_2$, passes to a DC voltage stopping or blocking circuit 11 which includes a capacitor 9 and a resistor 10. In order to avoid unloading of the monostable multivibrator and to obtain impulses having a steep rise and sharp drop, it may be desirable to connect a switching amplifier to the output of the multivibrator. This, however, is not essential to the operation of the circuit.

An impulse series $u_3$ appears on an output 3 of the DC voltage stopping circuit 11 during the stable periods of the monostable multivibrator 8 and is a positive voltage of magnitude $U_3$, proportionate to the frequency, $f_b=1/T_b$ of impulse series $u_1$:

$$U_3 = T_o \, U_2 \, f_b.$$

This impulse series $u_3$ passes to a function generator or transformer 17 which, during the stable periods of the monostable multivibrator 8, transforms voltage $U_3$, proportionate to frequency $f_b$, (i.e. function $h=h(f_b)$), converting it into a voltage proportionate to the relative linearity error and of a sign corresponding to the sign of the error.

Function transformer 17 transforms the function $h=h(f_b)$ by means of approximating straight lines. In order to transform the function $h=h(f_b)$ of general case, an impulse series of the same frequency as $U3$ but of reverse sign, $-u_3$ is required. This impulse series is produced by a conventional sign inverter or by the impulse series $u_2$, that appears across output 2, being passed through a second DC voltage circuit of the same construction as circuit (11).

An approximate straight line signal is produced by an approximation element 15 formed of resistors 12, 13 and diode 14, by the use of a reference voltage $-U_R$. As many such approximation elements 15, or additional approximation elements similar to it that might include the application of a reference voltage $+U_R$ instead of $-U_R$, are used as required for the number of approximate straight lines intended to be produced. The design of such individual approximation elements is known, as these elements are conventional. The currents of individual approximation elements are summed by a summing amplifier 16.

Assuming that the linearity error of the output signal of momentary frequency $f_b$ from the meter converter is negative, function transformer 17 will transform voltage $U_3$ proportionate to frequency $f_b$, into a voltage $-U_4$, proportionate to relative linearity error $h$, of negative sign. In case of a positive linearity error, the linearity voltage $U_4$ appearing on the output of function transformer 17 during the stable conditions of the monostable multivibrator 8 would be positive.

A level regulator 22 transfers the zero voltage level fed to its input to the peak value of voltage $u_4$ proportionate to linearity error H; this voltage being of a sign corresponding to that of the linearity error. Level regulator 22 includes a capacitor 19, a resistor 21 and a switch 20 controlled by the monostable multivibrator 8. Obviously, switch 20 may be any switching device which is opened or closed in response to the multivibrator condition.

Level regulator 22 is connected to function transformer 17 by a switch 18, such switch being similar to switch 20 and also controlled by monostable multivibrator 8. While the monostable multivibrator is in the stable condition, switch 20 connects a terminal 5 to zero voltage level, and switch 18 connects a terminal 4 to the output of function transformer 17, Thus a capacitor 19 is charged under the effect of voltage $-U_4$ appearing across terminal 4.

In the quasi-stable period of the monostable multivibrator 8, switch 20 breaks circuit, switch 18 connects terminal 4 to zero voltage level, and the voltage that appears across the terminal 5 due to the capacitor 19 charge, will be $U_5=U_4$. Capacitor 19 is of a capacitance high enough so that the time constant resulting from the capacitor 19 and resistors 21,23 is considerably longer than the duration $T_o$ of the quasi-stable period of the monostable multivibrator 8. Thus the drop of the tops of the voltage impulses of duration $T_o$ and amplitude $U_5$ that appear across the terminal 5 is negligible.

It will be noted that across terminal 5 in every cycle time $T_b$, a voltage of a duration $T_o$, proportionate to the relative linearity error $h$ associated with the momentary frequency $f_b$ will appear. The mean value of this voltage $u_5$, therefore, is proportionate to the product of frequency $f_b$ and relative linearity error $h$. The polarity of voltage $u_{27\ 5}$ is positive when the linearity error is negative, and negative, when the error is positive. 36

A voltage-frequency converter 39 is connected to terminal 5 and on one of its outputs, 6 or 40, produces an impulse series of a frequency $f_h$ proportionate to the mean voltage that appears across terminal 5 and synchronous with the series of impulses $u_1$ of frequency $f_b$. The impulse series of frequency $f_h$ appears on output 6 and passes to a impulse-series adding device 44, when voltage across terminal 5 is positive, that is to say, linearity error is negative, and it appears on output 40 which is connected to an impulse series subtracting device 50, when the voltage across terminal 5 is negative, i.e. linearity error is positive.

Voltage-frequency converter 39 consists of an integrator 27 and an impulse generator 38. The output voltage of integrator 27 rises in the negative or positive sense depending on the polarity of the voltage that appears across terminal 5. When this voltage has reached a definite negative or positive level, the impulse generator 38 emits an impulse of constant amplitude and constant duration to discharge a capacitor 26 of integrator 27 by a constant charge. At the same time, an impulse appears on output 6 or output 40. In order to synchronize this impulse with the impulse series $u_1$ of frequency $f_b$ that appears on terminal 1, impulse generator 38 is driven by monostable multivibrator 8. Monostable multivibrator 8 also controls the constant duration of the impulse that discharges capacitor 26.

Impulse generator 38 includes a gate 28 controlled by the output voltage of integrator 27. This gate opens at a given negative voltage level while a gate 29 opens at a given positive voltage level, the impulse generator also includes an inverter 32, bistable multivibrators 34, 35 and switches 36, 37 controlled by the two bistable multivibrators. Bistable multivibrators 34, 35 are of the dynamic control type. They change to one state under the effect of a negative voltage surge across their inputs 30, 31 and into the state under the effect of a negative voltage surge on a common input 33.

In response of the negative voltage surge taking place on common input 33 under the effect of the impulse arriving from output 2 the monostable multivibrator 8, bistable multivibrators 34, 35 switch into a condition under which a low voltage level (zero level by a fair approximation) appears on outputs 6, 40. Then switches 36, 37 open to break circuit. Bistable multivibrators 34 or 35 remain in this condition until one of gates 28, 29 closes down the path of the impulses arriving from output 2 of monostable multivibrator 8.

Under the effect of voltage $u_5$, positive to correspond to an assumed negative linearity error, the output voltage of integrator (27) rises in the negative sense until it reaches a given voltage level. Then gate (28) opens and the negative voltage surge of the next impulse that arrives from output (2) of monostable multivibrator (8) passing to input (30) of bistable multivibrator (34) causes the multivibrator to change state and switches the output (6). Voltage appearing on output (6) operates switch (36) and passes reference voltage $-U_R$ to resistor (24) of integrator (27). The next negative voltage surge that arrives at input (33) of the bistable multivibrator (34), however, changes the bistable multivibrator (34) back to its former condition. The impulses arriving at inputs (30) and (33), respectively, are the inverse of each other, and for this reason, the interval between the negative voltage surges that cause the bistable multivibrator (34) to change state is $T_o$. Thus an impulse of duration $T_o$ appears on output 6, and also switch 36 sends reference voltage $-U_R$ of a polarity opposite to that of the voltage across output terminal 5 of level regulator 22, to a resistor 24 of integrator 27. The impulse of duration $T_o$ and amplitude $-U_R$ passes a constant discharging charge defined by resistor 24 to capacitor 26. Following this, the output voltage of the integrator 27 changes in the positive sense and the gate 28 closes again. After this the cycle starts anew.

Thus on output terminal 6 of voltage-frequency converter 39, an impulse series $u_6$, synchronous with series $u_1$ of frequency $f_b$ will appear and pass to the impulse-series adding device 44. The frequency of impulse series $U_6$ is proportionate to the mean voltage across output terminal 5 of level regulator 22. By properly selecting the conversion factor of the voltage-frequency converter 39, preferably by the adequate selection of the ratio of resistors 23, 24 the frequency of impulse series $u_6$ will be $f_h$, equal to the product of frequency $f_b$ and the relative linearity error $h$ ordered to it.

In case of a positive error of linearity, negative voltage appears across terminal 5 and the output voltage of integrator 27 rises in the positive sense. Now it is the gate 29 that opens at a given positive voltage, and the negative voltage surge of the next impulse arriving from output 2 of the monostable multivibrator 8 passes to input 31 of the bistable multivibrator 35. The multivibrator 35 now changes state, but then changes back to the original state under the effect of the negative voltage surge arriving from the inverter 32. As a consequence, a voltage impulse of duration $T_o$ appears on output 40 and a switch 37 passes a capacitor discharging voltage $+U_R$ to resistor 25 of integrator 27 for a duration $T_o$. The discharging reference voltages $-U_R$ and $+U_R$ are equal in magnitude and the transmission factor related to the negative and positive input voltages of voltage-frequency converter 39 is uniform with resistance 25 equal to resistance 24.

With a positive linearity error, a series of impulses, synchronous with series $U_1$ of frequency $f_b$, will appear on output 40 of the voltage-frequency converter 39 and the frequency of the new series is $f_h$, equal to the product of frequency $f_b$ and relative linearity error $h$, ordered to it. This series of impulses goes to the impulse-series subtracting device 50.

Impulse-series adding device 44 adds impulse series $u_1$, of frequency $f_b$ to series $u_6$ of frequency $f_h$. Considering that impulse-series $u_6$ are synchronized, the impulse-series adding device is of simple construction. Under the effect of negative voltage surges arriving at capacitors 41, 42, a monostable multivibrator 43 changes from a stable to quasi-stable state for a duration shorter than $T_o$. The impulse series of mean frequency, equal to the sum of the frequencies of $u_1$ and $u_6$, that appears on output 45 passes through impulse-series subtracting device 50 to terminal 7. The first impulse arriving from impulse-series adding device 44 through a time delay element 49 causes a bistable multivibrator 46 to change state so that a gating voltage passes to input 47 and AND-gate 48. As no impulse series is now present on the output 40 of voltage-frequency converter 39, this condition is preserved. Thus the impulses that appear on output 45 of impulse-series adding device 44 pass through AND-gate 48 unchanged and appear across terminal 7.

In case of a positive linearity error, no impulse series appears on output 6 of the voltage-frequency converter 39. An impulse series of frequency $f_h$, synchronous with series $u_1$ of frequency $f_b$, appears on output 40 to pass to impulse-series subtracting device 50. Another impulse series, transformed by monostable multivibrator 43 from series $u_1$, of frequency $f_b$, likewise passes to the impulse-series subtracting device 50. As an impulse appears on output 40 of voltage-frequency converter 39, the negative voltage surge thereof causes bistable multivibrator 46 to change state so that a negative voltage level passes to input 47 of AND-gate 48. Under such conditions, the next impulse of the series of frequency $f_b$ that arrives from output 45 of impulse-series adding device 44 cannot reach terminal 7, yet the negative voltage surge of this impulse (back of the impulse), after the delay provided by time delay element 49 trips the bistable multivibrator 46 to the opposite condition, to permit a gate voltage to pass to input 47 of AND-gate 48. Thus further impulses arriving from output 45 are allowed to pass to terminal 7 until the next impulse appears on output 40 of voltage-frequency converter 39 which reverses bistable multivibrator 46 and the process discussed above takes plane anew. In order to ensure the correct timing of control impulses that arrive at the two inputs of the bistable multivibrator 46, the duration of the quasi-stable state of monostable multivibrator 43 together with the delay provided by time delay element 49 is shorter than the duration $T_o$ of the synchronous impulses arriving at output 40 of voltage-frequency converter 39.

Every time a new impulse appears on output 40 of the voltage-frequency converter 39, the next impulse that arrives from terminal 1 through impulse-series adding device 44 is prevented from passing to terminal 7. Thus, in case of a positive linearity error, a series of impulses of an average frequency corresponding to the difference of frequency $f_b$ of the series appearing on output 45 of impulse-series adding device 44 and frequency $f_h$ of the series appearing on output 40 of voltage-frequency converter 39 appears on terminal 7.

The series of impulses, of a mean frequency resulting from the sum of difference of the series of frequencies $f_b$ and $f_h$, respectively, is fed to information processing electronic devices of a known type.

FIG. 9 shows an alternative of the circuit presented in FIG. 8 including minor modifications, and represents a simpler alternative for the case which frequently occurs in practice when $h=0$ relative linearity error is associated, or can be ordered, with frequency $f_b=0$. Here through a rectifier 51 is inserted between terminal 3 of DC voltage stopping circuit 11 and function transformer 17, level regulator 22 follows function transformer 17 directly, and switch 18 controlled by monostable multivibrator 8 is dispensed with. The function of this switch, namely to connect the input terminal 4 of level regulator 22 to zero level for the durations of the quasi-stable conditions of monostable multivibrator 8, is accomplished by rectifier 51 which, from voltage $U_3$ across terminal 3, passes only the positive voltage that arises during the stable periods of the monostable multivibrator 8 and blocks the negative voltage arising during the quasi-stable periods. Under such conditions, zero voltage level passes to the input of function transformer 17, and also, zero voltage level appears on the output of function transformer 17 i.e. across 4. (4).

FIG. 9 includes another variant of the circuit of FIG. 8 for the general case $h=h\,(f_b)$, for in this case, a switch 18a controlled by monostable multivibrator 8 forms the reference input $-U_R$ to the function transformer 17.

When the linearity error of the meter converter does not change signs throughout the measuring range, either the impulse-series adding device 44 or the subtracting device 50 may be omitted. In such case, the voltage-frequency converter 39 is expected to operate only on the input voltage of the polarity corresponding to the sign of the linearity error, and either gate 28, bistable multivibrator 34 and switch 36, or gate 29, bistable multivibrator 35 and switch 37 may be omitted.

We claim:

1. A linearity error compensation circuit for a meter converter of the type which provides an output signal having a frequency which is indicative of a metered function comprising a monostable multivibrator means connected to receive the output signal from said meter converter, said monostable multivibrator means being driven by said meter converter output signal between a stable and a quasi-stable state to provide a series of impulses, conversion means connected to receive said impulses and operative to convert impulses produced during the stable state of said monostable multivibrator means to a voltage proportionate to the relative linearity error of the output signal from said meter converter and of the same polarity as said linearity error, level regulator means connected to receive the voltage output from said conversion means and operative to provide a mean voltage proportionate to the product of a momentary frequency signal at the output of said meter converter and the linearity error associated with such momentary frequency signal, voltage to frequency conversion means connected to receive the mean voltage output from said level regulator means, and operative to produce an impulse series of a frequency proportionate to said mean voltage, and arithmetic means connected to receive the impulse series from said voltage to frequency conversion means and the output signal from said meter converter, said arithmetic means operating to provide a linearized output signal.

2. The linearity error compensation circuit of claim 1 wherein said voltage to frequency conversion means is connected to receive the output impulses from said monostable multivibrator means, said voltage to frequency conversion means operating in response to said output impulses to synchronize the impulse series provided to said arithmetic means with the output signal from said meter converter.

3. The linearity error compensation circuit of claim 1 wherein said conversion means includes a DC voltage blocking circuit means connected to receive the output from said monostable multivibrator means and operative to provide a DC voltage output during the stable periods of said monostable multivibrator means, a function transformer means operative to receive the DC voltage from said DC voltage blocking circuit means and to convert such voltage to a voltage proportionate to the linearity error of the output signal from said meter converter, and switch means operative to control a circuit between said function transformer means and said level regulator means in response to the output from said monostable multivibrator means, said switch means operating when said monostable multivibrator means is in the stable state to connect the output said function transformer means to said level regulator means and when said multivibrator means is in the quasi-stable state to connect said level regulator means to a zero voltage reference source.

4. The linearity error compensation circuit of claim 3 wherein said level regulator means includes a capacitor having a first terminal connected to said switch means and a second terminal, and level regulator switch means connected to said second terminal and operative in response to the output from said multivibrator means, said level regulator switch means operating to connect said second terminal to a zero voltage reference source when said monostable multivibrator means is in the stable state and to break the connection to said zero voltage reference source when said monostable multivibrator means is in the quasi-stable state.

5. The linearity compensation circuit of claim 1 wherein said level regulator means provides a mean voltage output of a polarity opposite to the polarity of said linearity error.

6. The linearity error compensation circuit of claim 5 wherein said voltage to frequency converter means includes first and second outputs, said voltage to frequency converter means operating to provide an impulse series of positive polarity and of a frequency proportionate to the mean voltage from said voltage regulator means on said first output when said mean voltage is positive and an impulse series of negative polarity and of a frequency proportionate to the mean voltage from said voltage regulator means on said second output when said mean voltage is negative.

7. The linearity error compensation circuit of claim 6 wherein said arithmetic means includes an impulse series adding means connected to said first output and operative to provide a output resulting from the sum of said positive impulse series and the output signal from said meter converter and an impulse series subtracting means connected to said second output and operative to provide an output resulting from the difference between said negative impulse series and the output signal from said meter converter.

8. The linearity error compensation circuit of claim 7 wherein said voltage to frequency conversion means is connected to receive the output impulses from said monostable multivibrator means, said voltage to frequency conversion means operating in response to said multivibrator means output impulses to synchronize the impulse series provided on said first and second outputs with the output signal from said meter converter.

9. The linearity error compensation circuit of claim 1 wherein said conversion means includes a DC voltage blocking circuit means connected to receive the output from said monostable multivibrator means and operative to provide a DC voltage output during the stable periods of said monostable multivibrator means, diode means connected to said DC voltage blocking means and operative to pass only a positive DC voltage therefrom arising during the stable periods of said monostable multivibrator means, and a function transformer means operative to receive the positive DC voltage from said rectifier means and to convert such voltage to a voltage proportionate to the linearity error of the output signal from said meter converter.

\* \* \* \* \*